P. UTNE.
BUMPER FOR MOTOR VEHICLES.
APPLICATION FILED FEB. 28, 1922.
1,417,118. Patented May 23, 1922.
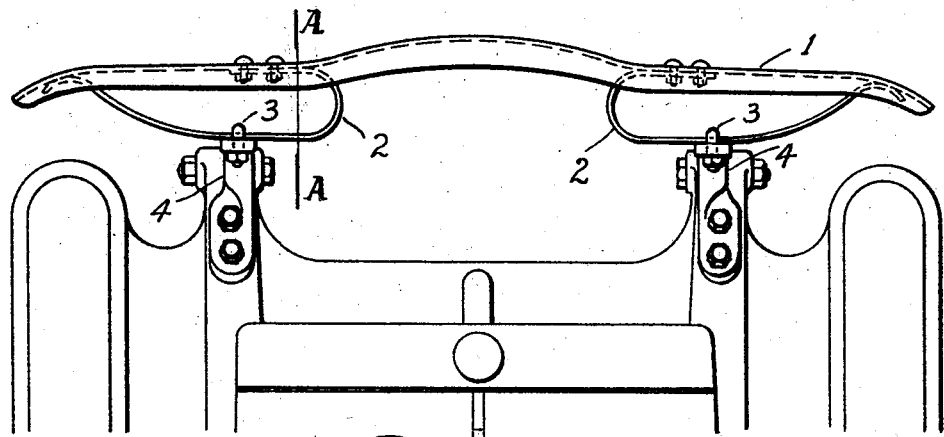
Fig. I
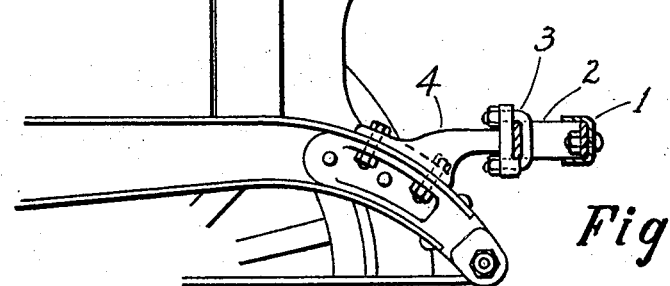
Fig. II
Fig. IV
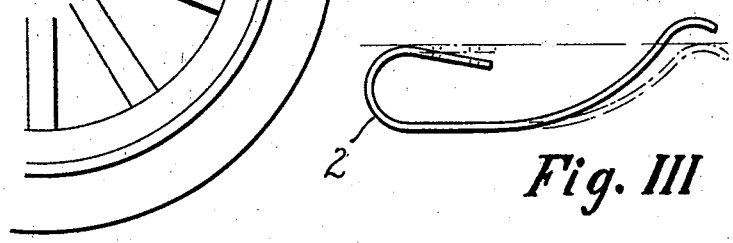
Fig. III
INVENTOR
Per Utne
BY
ATTORNEY

UNITED STATES PATENT OFFICE.

PER UTNE, OF SOUTH ORANGE, NEW JERSEY.

BUMPER FOR MOTOR VEHICLES.

1,417,118. Specification of Letters Patent. Patented May 23, 1922.

Application filed February 28, 1922. Serial No. 540,027.

*To all whom it may concern:*

Be it known that I, PER UTNE, a citizen of the United States, residing in South Orange, county of Essex, and State of New Jersey, have invented certain new and useful Improvements in Bumpers for Motor Vehicles, of which the following is a specification.

My invention relates to bumpers or buffers for motor vehicles, and it has for its object to provide a bumper which is durable, simple and economically manufactured and can be easily repaired in case of distortion or breakage. I will describe a bumper embodying my invention and then point out the novel features thereof in claims.

In the accompanying drawings, Fig. I is a top plan view of a bumper embodying my invention and suitably attached to a motor vehicle, only a portion of which is shown. Fig. II is a vertical sectional view taken on the line A—A, Fig. I. Fig. III is a detail view of a spring forming part of a bumper embodying my invention. Fig. IV is a top view of a modification embodying my invention.

Similar reference characters designate corresponding parts in the several figures.

In the drawings, 1 designates a bar, preferably of a U-formed cross-section, formed from suitable material, preferably steel. The center portion is shown curved outward and the ends curved backward. While the channel may be formed in a straight line for its entire length, it will be seen that the outwardly curved central portion will assist in centralizing shocks and thus distribute the pressure due to shocks more evenly to the frame of the vehicle. The object of curving the ends is to reduce the space covered by the bumper and also add to the appearance.

It will be noticed that the flanges of the channel 1 are highest at the center and gradually taper down towards the ends. This taper not only adds to the appearance, but it provides a stronger section in the center portion where the maximum strength is needed and consequently the material is used to its best advantage, giving a maximum strength and keeping the weight down to a minimum and without establishing any weak sections in the channel.

Fastened securely to the channel 1 are the springs 2. It will be noted that only one end of each spring, which is bent in approximately a half circle is secured to the channel. The other end, which is formed to give additional support to the channel engages with it and is free to slide in the channel when deflected. The form of each spring is preferably such that tension is set up in it when secured to the channel in order to prevent rattling.

Fig. I shows the springs attached to the channel 1, with the free ends turned out, while same could be turned in towards the center as well without departing from the scope of this invention as shown in Fig. IV.

The springs as shown in Fig. III are secured to brackets 3, which in turn are fastened to the frame of vehicle as indicated at 4.

What I claim as my invention is:

1. A bumper comprising a bar; and a pair of springs, one end portion of each spring being bent in a half circle and secured at that end to the bar, and the other end pressing against the bar and having a sliding engagement therewith.

2. In combination a bumper comprising a channel bar and a pair of springs, one end portion of each spring being bent in a half circle and secured at that end to the bar between the flanges, and the other end pressing against the bar and having a sliding engagement therewith.

PER UTNE.

Witnesses:
JOHN D. MUNTHER,
GEORGE E. MYERS.